Sept. 22, 1964 C. L. KIMBELL 3,150,348
METHOD AND APPARATUS FOR MONITORING THE TIME
ACCURACY OF RECORDING DEVICES
Filed Oct. 13, 1960 2 Sheets-Sheet 1
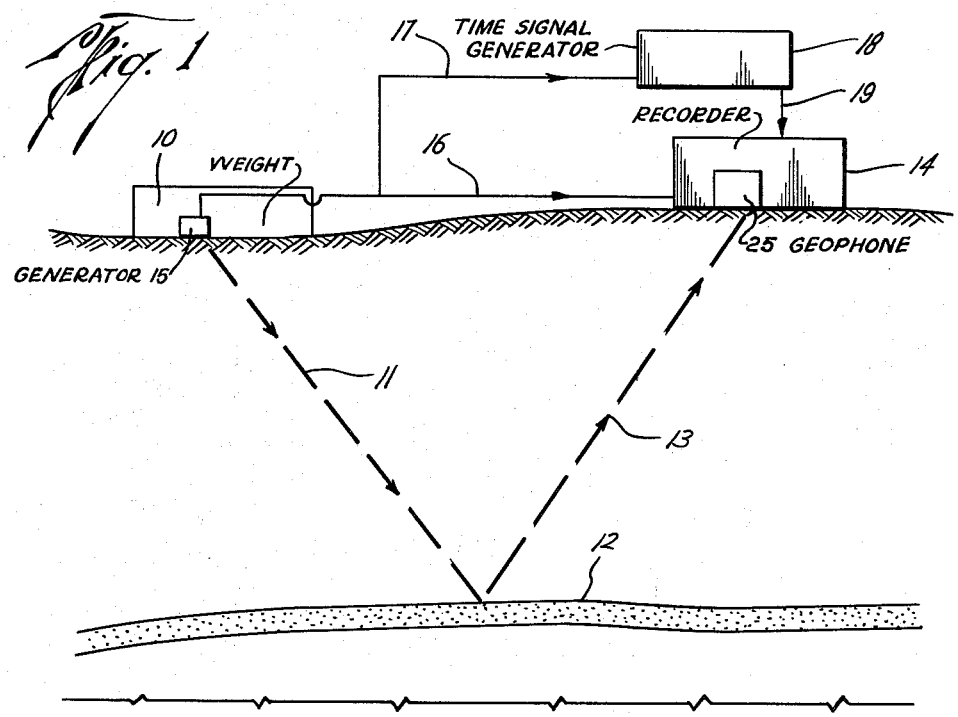
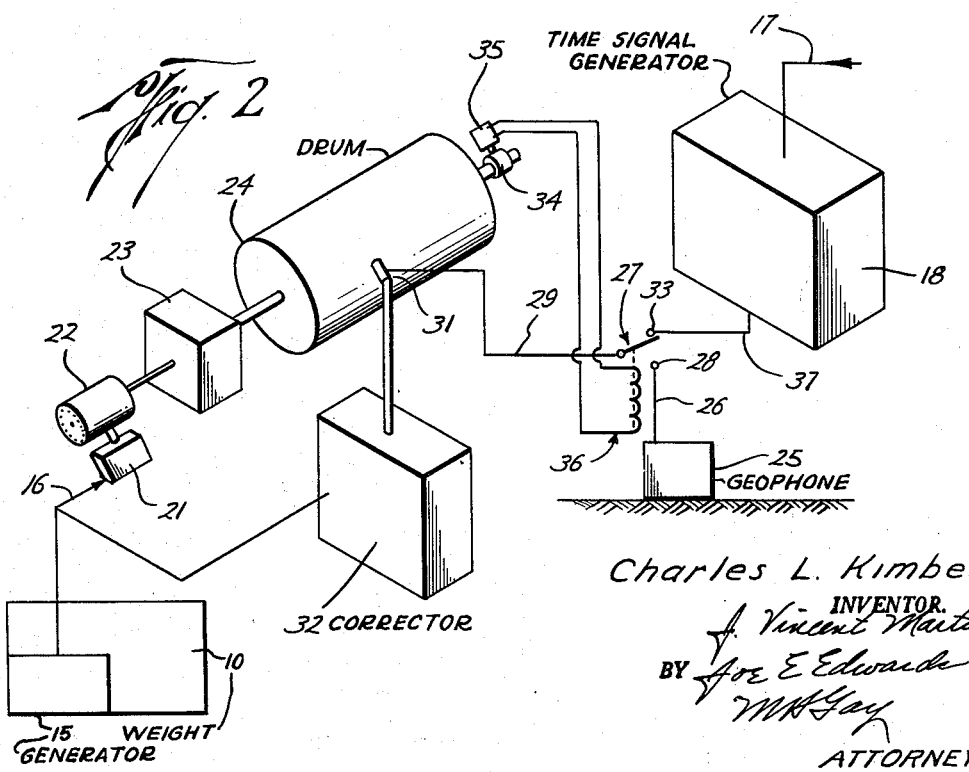
Charles L. Kimbell
INVENTOR.
J. Vincent Martin
BY Joe E Edwards
M K Gay
ATTORNEYS

United States Patent Office 3,150,348
Patented Sept. 22, 1964

3,150,348
METHOD AND APPARATUS FOR MONITORING THE TIME ACCURACY OF RECORDING DEVICES
Charles L. Kimbell, San Angelo, Tex., assignor to Independent Exploration Company, Houston, Tex., a corporation of Delaware
Filed Oct. 13, 1960, Ser. No. 62,422
6 Claims. (Cl. 340—15.5)

This invention relates to methods and apparatus for monitoring the timing accuracy of seismic recording devices, and more particularly to such method and apparatus which will economically monitor a single-channel recording of a seismic signal. The recording of seismic signals is carried out on a moving medium having an X axis representing time and a Y axis representing the amplitude of the signal. Because of economic considerations, it is vital that time measurements be accurate and not subject to unknown variations.

In the past it has been conventional to simultaneously record data from a plurality of geophones on a plurality of channels. At the same time a timing pulse is recorded. This timing pulse has been utilized to check the accuracy of the timing lines along the X axis.

Under certain circumstances it is desirable to record seismic data on one channel at a time. While a timing channel could be utilized with each single data recording, it is very undesirable to do so as this requires the use of two channels for recording each seismic signal.

It is an object of this invention to provide method and apparatus for monitoring the timing accuracy of recording devices without using an excessive number of monitoring channels.

Another object of this invention is to provide method and apparatus of monitoring the timing accuracy of a seismic data recorder in which the monitoring signal is recorded on the same channel as the seismic signal.

Another object is to provide a method and apparatus for monitoring the time accuracy of recording devices in which the seismic signal is recorded and a timing signal is subsequently recorded on the same channel a predetermined interval of time after the seismic signal was generated. Another object is to provide method and apparatus for monitoring the timing accuracy of seismic recording devices in which a single channel of the recording device first records the seismic signal alone and then records a timing signal alone, with the timing signal beginning at a selected time interval after generation of the seismic signal.

Other objects, features and advantages of this invention will be apparent from the specification, the claims and the drawings.

In the drawings, wherein an illustrative embodiment of this invention is shown:

FIGURE 1 is a schematic illustration of the generation and recording of seismic data in accordance with this invention;

FIGURE 2 is a schematic illustration of apparatus used in practicing this invention and illustrates the method of the invention;

Figure 3:
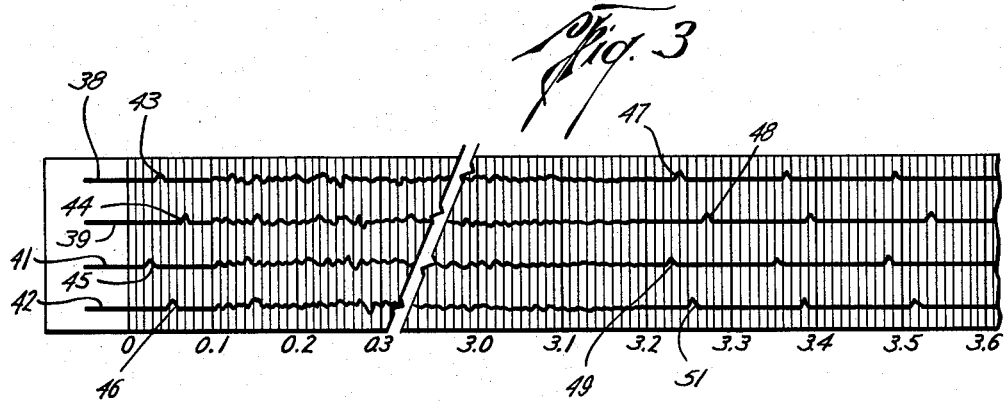
FIGURE 3 is a view of a chart made in accordance with this invention of several pieces of seismic data with the chart uncorrected.

In practicing this invention, a seismic signal may be generated in any conventional way, such as by explosive or weight dropping, and reflected back to the conventional geophone. Simultaneously with generation of the seismic wave a control signal is generated. This control signal triggers operation of the recording cycle and the signal from the geophone is recorded in the conventional manner.

Additionally the control signal triggers operation of a timing device which generates a timing signal at a selected time interval after the control signal was generated. This time signal is fed to the recording device during the latter part of the recording cycle and recorded on the same channel as the seismic data. Preferably, the recording of the seismic data and the time signal is sequential and alternative.

Referring to FIGURE 1, means for generating a seismic signal is shown by weight 10 which may be dropped upon the earth to generate a seismic signal represented by line 11. This signal strikes a reflective layer 12 within the earth and reflects a signal represented by the line 13. This signal is recorded by the recording device 14. At the instant of generation of the seismic signal, means 15 generated a control signal which was transmitted over line 16 to the recording device to trigger the beginning of the recording cycle. This control signal also passed over line 17 to a time signal generating device 18 and triggered operation of the time signal generating means. After a predetermined time interval, the time signal generating means 18 generates a time signal which is fed to the recorder means 14 over line 19 and recorded on the same channel as the seismic data during the last portion of the recording cycle. As the time signal is recorded a predetermined interval of time after generation of the seismic signal, each time pulse will appear on the recording at a different time interval. If any malfunction has occurred during making of the record, the time pulse will not correlate with the time lines on the record, to indicate such malfunction. As the amplitude of seismic waves decreases with time, the time pulse could be superimposed upon the seismic wave. However, it is preferred to alternately record first the seismic data and then the time pulse.

Referring now to FIGURE 2, there is shown more in detail the method and apparatus for carrying out this invention. The control pulse from the generator means 15 is fed to means 21 which energizes motor 22. The output from motor 22 is fed through a suitable reduction gear 23 to the recording drum 24 which carries the media on which the recording is made. Thus, at the instant that the control signal is generated by means 15 the signal is fed to the recorder device and begins operation of the recording means to begin rotation of the drum 24 and thus commence the recording cycle.

The reflected seismic wave is picked up by geophone means 25 at the surface of the earth and converted to an electrical wave. The output from the geophone means 25 travels through line 26, a switch indicated generally at 27 which at this time engages contact 28, and thence through line 29 to the recorder head 31. As the drum rotates the signal fed to recorder head 31 is recorded on the recording medium.

The recorder head 31 is preferably positioned by means 32 relative to zero position on the recording drum, so as to introduce into the record at this time several variables encountered in making seismic data recordings. As will be understood by those skilled in the art, this correction would reflect average velocity of the seismic wave, elevation of the seismic source, etc. While this correction might be applied to the recorded data at a later time, it is preferable to adjust the position of recording head 31 at the time the signal is recorded, but either procedure might be followed in carrying out this invention.

After a short period of time the amplitude of the seismic signal decreases and at about this time, which is in the latter part of the recording cycle, the switch means 27 is shifted to engage contact 33. The operation of switch 27 may be triggered by any device responsive to the beginning of the recording cycle which will effect operation of switch 27 after completion of a selected portion of the recording cycle.

Preferably, the recording drum 24 activates a system for operating switch 27. By way of example, a cam 34 or other appropriate means may operate switch 35 in response to drum 24 rotating through a selected portion of the recording cycle. A signal from means 35 energizes the coil of a solenoid 36 connected to switch 27 to move the switch to a position engaging contact 33.

In the meanwhile the control signal generated by means 15 has been fed through line 17 to the time signal generating means 18. This is a count-down device which, once actuated, will generate a time signal after the lapse of a predetermined period of time. After switch 27 engages contact 33 the time signal generated by means 36 is fed through the conduit 37 to contact 33 and thence through line 29 to the recorder head 31. The time signal is then recorded on the same channel as the previously received seismic signal. For simplicity of circuitry and to provide a series of time signals, it is preferred that the time signal generating means begin generating impulses at spaced time intervals before switch 27 engages contact 33, and to continuously generate these time-spaced pulses throughout the recording cycle. However, due to switch 27, the first time signal will not be recorded until the contact 33 is engaged by switch 27. Thereafter, time pulses will be recorded at spaced intervals throughout the remainder of the recording cycle.

By way of example, the total recording cycle might extend over a four-second period. During the first 1/10 of a second means 32, which was also activated by the signal pulse 16, is adjusting the position of recording head 31. During the next three seconds the seismic signal is recorded. At this time the switch 35 is energized to disconnect geophone 25 and connect the time generating means 36. The time generating means preferably generates a time pulse every .1333 second. Thus, at 3.2 seconds the first time pulse will be recorded. Thereafter, a time pulse will be recorded every .1333 second during the remainder of the recording cycle.

Figure 4:
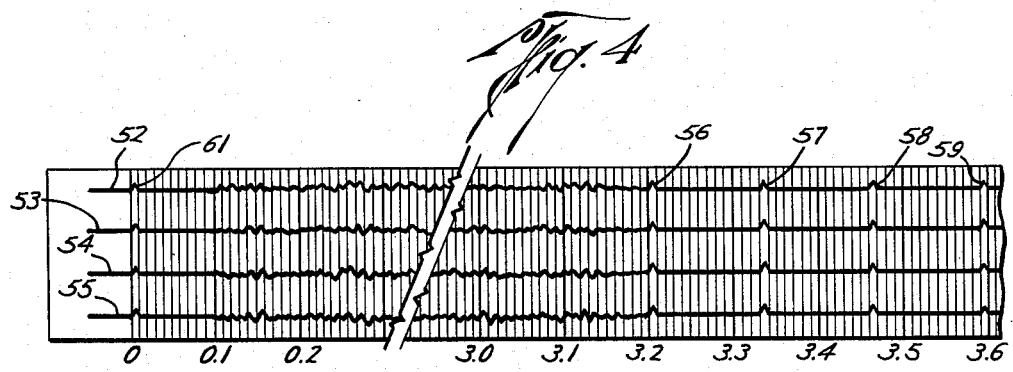
FIGURE 4 is a view similar to FIGURE 3 showing a recording of several bits of seismic data with the chart corrected; and, FIGURE 5 is a view of a corrected chart similar to FIGURE 4 in which malfunctions occurred during recording.
Figure 5:
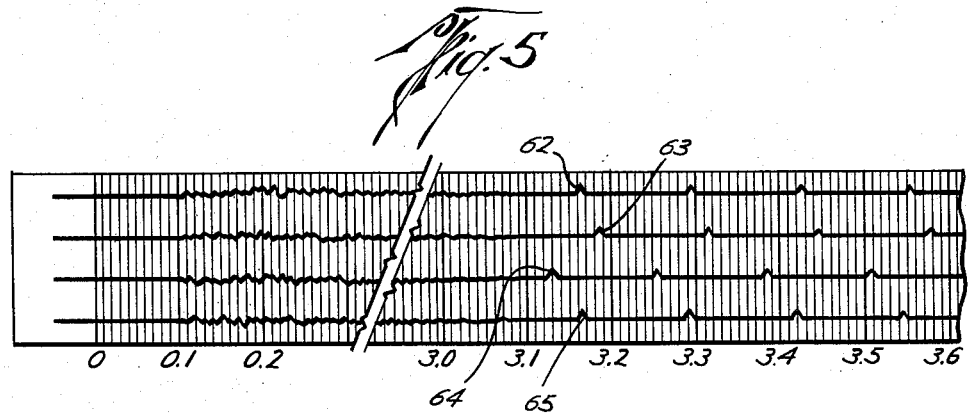

Reference is made to FIGURES 3, 4 and 5 which illustrate the type of record which will be made in practicing this invention. In FIGURE 3 a recording having four separate seismic signals 38, 39, 41 and 42 is shown. This recording depicts an uncorrected signal. That is, the recording head 31 was not adjusted to introduce the various corrections referred to above. The pulses 43, 44, 45 and 46 are theoretical. The pulses 47, 48, 49 and 51 are the first time pulses recorded and each represents a time lapse of 3.2 seconds. During the playback of this recording the several corrective factors referred to above will be introduced and at this time the pulses 47 through 51 will fall on the 3.2 second line. It will be noted that as the signal is shifted to introduce these corrections, the theoretical pulses 43 through 46 will coincide with the zero time line.

Referring now to FIGURE 4, a recording is shown on which several seismic signals 52 through 55 have been recorded. The corrective factors were introduced by shifting recording head 31 at the time the recording was made. Therefore, when the first time pulse 56 was recorded, it fell on the 3.2 second line. It will be noted that successive time pulses 57, 58 and 59 follow the time pulse 56 at intervals of .1333 second. It will further be noted that the theoretical time pulses coinciding with zero time, such as 61, appear at the zero time line. When a recording appears, as in FIG. 4, the recording is known to be a true recording and no malfunction of any of the equipment occurred. As the first time pulse 56 occurred on a 3.2 second line, the operator knows that the recording apparatus functioned properly. As the successive pulses 57, 58 and 59 occurred at .1333 second apart, the operator knows that the time generating portion of the apparatus functioned properly.

In FIGURE 5 there is shown a corrected recording in which malfunctions of some type were present. When the time pulses 62, 63, 64 and 65 do not fall on the 3.2 second line, the operator knows that an error was introduced in some way and his equipment malfunction must be corrected and the survey repeated.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. Seismic signal recording apparatus comprising, means simultaneously generating a seismic signal and a control signal, geophone means receiving a reflection of said seismic signal, recorder means electrically connected to the geophone means and recording the seismic signal received by said geophone means, means receiving said control signal and initiating operation of said recording means upon receiving said control signal, time means receiving said control signal and generating a time signal at a selected time interval after receiving said control signal, and means disconnecting the geophone means from the recorder means and electrically connecting said time means to the recorder means after completion of a selected portion of the recording cycle, said recorder means recording time signals on the same channel on which the seismic data is recorded.

2. Seismic signal recording apparatus comprising, means simultaneously generating a seismic signal and a control signal, geophone means receiving a reflection of said seismic signal, recorder means electrically connected to the geophone means and recording the seismic signal received by said geophone means, means receiving said control signal and initiating operation of said recording means upon receiving said control signal, time means receiving said control signal and generating a series of time signals at selected time intervals after receiving said control signal, and means disconnecting the geophone means from the recorder means and electrically connecting said time means to the recorder means after completion of a selected portion of the recording cycle, said recorder means recording time signals on the same channel on which the seismic data is recorded.

3. Seismic signal recording apparatus comprising, means simultaneously generating a seismic signal and a control signal, geophone means receiving a reflection of said seismic signal, recorder means electrically connected to the geophone means and recording the seismic signal received by said geophone means, means receiving said control signal and initiating operation of said recording means upon receiving said control signal, time means receiving said control signal and generating a time signal at a selected time interval after receiving said control signal, and switch means disconnecting the geophone means from the recorder and electrically connecting the time means to the recorder means after completion of a selected portion of the recording cycle to record time pulses after completion of the seismic signal recording, said recorder means recording the pulses on the same channel on which the seismic data is recorded.

4. Seismic signal recording apparatus comprising, means simultaneously generating a seismic signal and a control signal, geophone means receiving a reflection of said seismic signal, recorder means electrically connected to the geophone means and recording the seismic signal received by said geophone means, means receiving said control signal and initiating operation of said recording means upon receiving said control signal, time means receiving said control signal and generating a time signal at a selected time interval after receiving said control signal, and switch means operable in response to operation of the recorder means through a selected portion of the recording cycle disconnecting the geophone means and connecting the time means to the recorder means whereby the time signals are recorded by the recorder means after completion of the seismic signal recording, said recorder means recording the seismic and time signals on the same channel.

5. The method of monitoring the timing accuracy of a seismic data recorder comprising, simultaneously generating a seismic signal and a control signal, starting a recorder cycle with said control signal, converting a reflection of the seismic signal to an electrical signal at the earth's surface, recording said electrical signal on a channel of the recorder, generating a time signal at a selected time interval after generating said control signal, and recording said time signal on said channel after the electrical signal has been recorded for a selected portion of the recorder cycle.

6. The method of monitoring the timing accuracy of a seismic data recorder comprising, simultaneously generating a seismic signal and a control signal, starting a recorder cycle with said control signal, converting a reflection of the seismic signal to an electrical signal at the earth's surface, recording said electrical signal on a channel of the recorder, generating a time signal at a selected time interval after generating said control signal, and recording said time signal on said channel instead of said electrical signal after the electrical signal has been recorded for a predetermined portion of the recorder cycle.

References Cited in the file of this patent
UNITED STATES PATENTS

| | | |
|---|---|---|
| 2,313,091 | Renner | Mar. 9, 1943 |
| 2,640,187 | Hasbrook | May 26, 1953 |
| 2,697,648 | Kerr et al. | Dec. 21, 1954 |
| 2,926,739 | Shoemaker | Mar. 1, 1960 |